US010816375B2

(12) United States Patent
Hokkanen et al.

(10) Patent No.: US 10,816,375 B2
(45) Date of Patent: Oct. 27, 2020

(54) APPARATUS AND METHOD FOR MEASURING AIR FLOW

(71) Applicant: FLÄKTGROUP SWEDEN AB, Jönköping (SE)

(72) Inventors: Jari Hokkanen, Toijala (FI); Jari Mikkonen, Nokia (FI); Teuvo Sillanpää, Helsinki (FI)

(73) Assignee: FLÄKTGROUP SWEDEN AB, Jönköping (SE)

( * ) Notice: Subject to any disclaimer, the term of this patent is extended or adjusted under 35 U.S.C. 154(b) by 42 days.

(21) Appl. No.: 16/312,018

(22) PCT Filed: May 19, 2017

(86) PCT No.: PCT/IB2017/052953
§ 371 (c)(1),
(2) Date: Dec. 20, 2018

(87) PCT Pub. No.: WO2018/002740
PCT Pub. Date: Jan. 4, 2018

(65) Prior Publication Data
US 2019/0376823 A1 Dec. 12, 2019

(30) Foreign Application Priority Data
Jun. 27, 2016 (FI) ...................................... 20165529

(51) Int. Cl.
*G01F 1/66* (2006.01)
*G01F 15/04* (2006.01)
*G01F 25/00* (2006.01)

(52) U.S. Cl.
CPC ............ *G01F 1/667* (2013.01); *G01F 15/046* (2013.01); *G01F 25/0007* (2013.01)

(58) Field of Classification Search
CPC ............ G01F 1/66; G01F 15/04; G01F 25/00
See application file for complete search history.

(56) References Cited

U.S. PATENT DOCUMENTS 4,860,593 A * 8/1989 de Concini ............. G01F 1/662
73/861.29
10,041,859 B2 * 8/2018 DeSilva ................. G01M 15/14
(Continued)

FOREIGN PATENT DOCUMENTS

DE   25 41 699 A1   3/1977
EP   0 200 896 A2   11/1986
(Continued)

OTHER PUBLICATIONS

International Search Report, issued in PCT/IB2017/052953, dated Aug. 8, 2017.
(Continued)

*Primary Examiner* — Jewel V Dowtin
(74) *Attorney, Agent, or Firm* — Birch, Stewart, Kolasch & Birch, LLP

(57) ABSTRACT

In an apparatus and method for measuring air flow in a duct, e.g. in a ventilation duct, the apparatus includes a sensor fittable into connection with the duct at a certain distance from an interference source, the sensor including an ultrasound transmitter and at least two ultrasound receivers, and a control unit to which the ultrasound transmitter and ultrasound receivers are connectable. The control unit is adapted to measure the phase difference of the ultrasound signal received at the same moment in time by at least two ultrasound receivers fitted into connection with the duct and, based on the measured phase difference, to determine the flow velocity and/or flow direction of the air. The control unit is adapted to compensate the determined flow velocity and/or flow direction of the air with a coefficient that is formed on the basis of the diameter of the duct, the type of interference source and the distance between the sensor and the interference source.

20 Claims, 8 Drawing Sheets

(56) References Cited

U.S. PATENT DOCUMENTS

| | | | |
|---|---|---|---|
| 10,557,739 B2 * | 2/2020 | Gagne | G01F 1/667 |
| 10,583,239 B2 * | 3/2020 | Loderer | G01F 1/74 |
| 2010/0319465 A1 | 12/2010 | Ajay et al. | |
| 2012/0266690 A1 * | 10/2012 | Ozaki | G01F 1/66 |
| | | | 73/861.18 |
| 2013/0333483 A1 * | 12/2013 | Horoshenkov | G01F 23/2962 |
| | | | 73/861.25 |
| 2014/0007698 A1 | 1/2014 | Peczalski et al. | |
| 2015/0081232 A1 | 3/2015 | Hansen et al. | |
| 2015/0127275 A1 * | 5/2015 | Hies | G01F 25/0007 |
| | | | 702/48 |
| 2017/0160117 A1 * | 6/2017 | Hurmuzlu | G01F 1/74 |
| 2017/0314977 A1 * | 11/2017 | Wiest | G01F 1/662 |

FOREIGN PATENT DOCUMENTS

| | | |
|---|---|---|
| EP | 2 228 631 A1 | 9/2010 |
| FI | 10752 | 1/2015 |
| JP | 2-98633 A | 4/1990 |
| WO | WO 2006/060650 A2 | 6/2006 |
| WO | WO 2009/071960 A1 | 6/2009 |
| WO | WO 2013/164805 A1 | 11/2013 |
| WO | WO 2015/096901 A1 | 7/2015 |

OTHER PUBLICATIONS

Written Opinion of the International Searching Authority, issued in PCT/IB2017/052953, dated Aug. 8, 2017.
European Office Action, dated Dec. 19, 2019, for European Application No. 17730277.5.

* cited by examiner

APPARATUS AND METHOD FOR MEASURING AIR FLOW

FIELD OF THE INVENTION

The invention relates to an apparatus and to a method for measuring air flow e.g. in a duct of a ventilation system.

BACKGROUND OF THE INVENTION

From the standpoint of the operation of a ventilation system, it is essential that the air flow in the air flow ductwork matches that designed. By examining the directions and velocities of air flows in ventilation ducts, it can be ensured that the system operates in the desired manner. Measuring the directions and velocities of the air flow also enables e.g. various manual or automatic adjustment procedures to be performed in the system.

In prior art air flow has been measured by the aid of a means installable in, or installed in, a ventilation duct. These types of air flow sensors cause pressure losses in the ventilation duct and also produce noise.

Also known in the art are flow sensors based on ultrasound. Typical of such a prior-art flow sensor is a volume flow rate meter based on measuring the average flow velocity, and its operation is based on measuring the difference in transit time between an ultrasound signal transmitted downstream and upstream. Also disclosed in prior art are so-called hybrid flow meters that operate both on the transit time principle and on the Doppler principle.

A problem in prior art systems is the effect of various interference sources, such as elbows, T-branches and adaptor fittings and sound diffusers, on measurement accuracy. Interference sources cause changes in the behavior of an air flow near the interference source, and in prior art systems therefore a certain distance must be left between the sensor and the interference source in order for the measurement result to correspond to the correct flow velocity and direction of the air flow.

BRIEF DESCRIPTION OF THE INVENTION

The apparatus according to the invention for measuring air flow is based on the use of ultrasound technology and on the measurement of the phase difference of ultrasound in a duct, e.g. in a ventilation duct. By means of the solution of the invention, changes caused by interference sources in the result of a flow measurement can be compensated, and in this way performance of a measurement closer to an interference source than in solutions known in the art is made possible.

The apparatus according to the invention comprises a sensor fittable into connection with the duct at a certain distance from an interference source, the sensor comprising an ultrasound transmitter and at least two ultrasound receivers, and a control unit to which the ultrasound transmitter and ultrasound receivers are connectable. The control unit is adapted to measure the phase difference of an ultrasound signal received at the same moment in time by at least two ultrasound receivers fitted into connection with the duct and, based on the measured phase difference, to determine the flow velocity and/or flow direction of the air. The control unit is adapted to compensate the determined flow velocity and/or flow direction of the air with a coefficient that is formed on the basis of the diameter of the duct, the type of interference source and/or the distance between the sensor and the interference source.

In one embodiment of the invention the type of interference source is an elbow, a T-branch and/or an adaptor fitting.

In one embodiment of the invention, the diameter of the pipe, the type of interference source and/or the distance between the sensor and the interference source can be determined and/or recorded in the system and/or in the control unit.

In one embodiment of the invention, one parameter, e.g. a number, which determines the coefficient to be used in compensation, is determined for the control unit and/or for the system on the basis of the diameter of the pipe, the interference type and/or the distance between the sensor and the interference source.

The solution according to the invention functions reliably also near an interference source, unlike solutions known in the art in which sensors must be disposed far from an interference source in order to enable a reliable measurement result.

BRIEF DESCRIPTION OF THE FIGURES

In the following, the invention will be described in more detail by the aid of some embodiments with reference to the drawings 1-6, wherein.

DETAILED DESCRIPTION OF THE INVENTION

Figure 1:
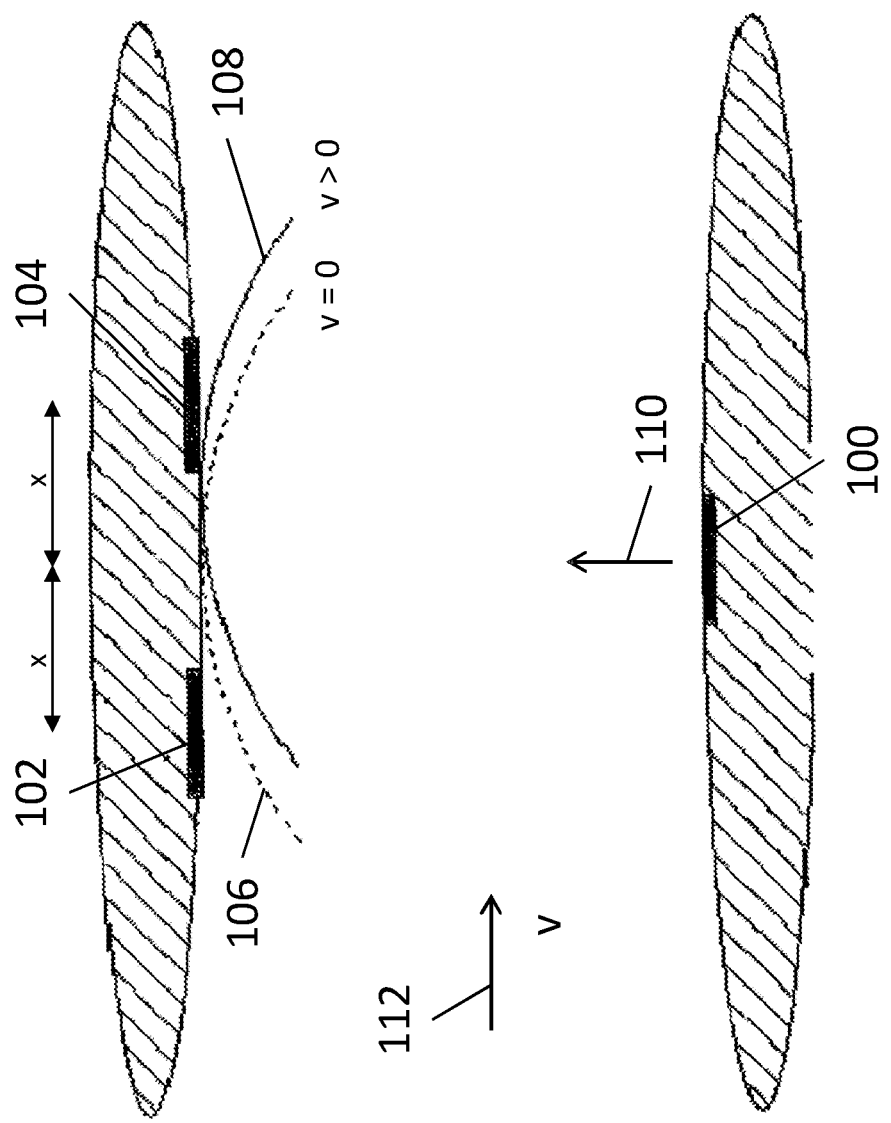
FIG. 1 presents the operating principle of an embodiment, according to the invention, of a flow sensor based on measuring a phase difference.

FIG. 1 presents the operating principle of an air flow sensor according to the invention. The apparatus comprises at least one ultrasound transmitter 100 and at least two ultrasound receivers 102, 104. During operation of the apparatus, the ultrasound transmitter 100 sends ultrasound and the receivers receive the ultrasound sent by the ultrasound transmitter. After this the ultrasound emissions received at the same moment in time are compared to each other and their phase difference is determined.

FIG. 1 also presents the phase fronts 106, 108 of the ultrasound emission 110. If the velocity v of the air flow 112 in the space between the transmitter and the receivers is zero, the phase front 106 propagates directly from the transmitter towards the receivers, at a right angle to the ventilation duct. If, in this situation, both the receivers 102, 104 are at an equal distance x from the transmitter 100, the ultrasound transmissions received by the receivers 102, 104 do not have a phase difference. By means of this, the apparatus can determine that the flow velocity v of the air in the space between the ultrasound transmitter 100 and the receivers 102, 104 is zero.

Figure 2:
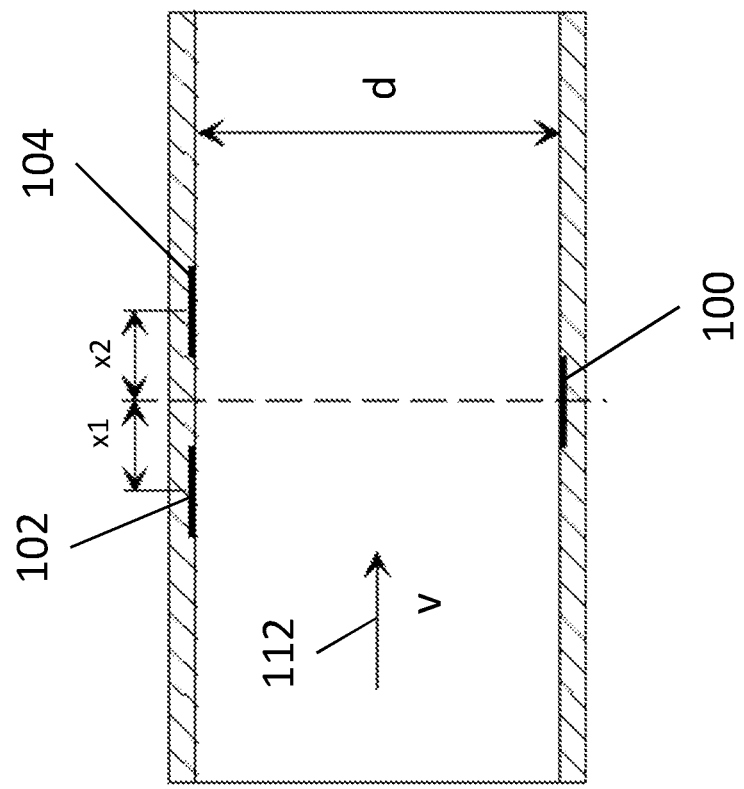
FIG. 2 presents the structure of an embodiment, according to the invention, of a flow sensor based on measuring a phase difference.

If there is an air flow in the space between the ultrasound transmitter 100 and the ultrasound receivers 102, 104, i.e.

the velocity v of the air flow 112 is greater than zero, the phase front 108 shifts in the direction of the flow. In this case, a phase difference is detected with the apparatus by comparing the ultrasound emission received at the same moment in time by the receivers 102, 104 and by means of this the direction and velocity v of the air flow in the space between the ultrasound transmitter 100 and the receivers 102, 104 can be determined FIG. 2 presents the structure of an air flow sensor according to the invention. The apparatus comprises a transmitter 100, installed at a right angle to the flow direction, and two or more receivers 102, 104. If the direction 112 of the flow is from left to right, the sound wave arrives at the sensor 104 on the right faster than at the sensor 102 on the left, i.e. the arriving sound wave has phase shifted. The phase shift is directly proportional to the average flow velocity v, to the distance (x1+x2) of the receivers 102, 104 and to the frequency of the ultrasound, but inversely proportional to the speed of sound. A phase shift of 360 degrees can, for example, correspond to an air flow velocity of 15 m/s.

In one embodiment of the invention, the distance of the receivers 102, 104 from each other (x1+x2) is 20 mm-80 mm. By using the aforementioned distance, optimally precise measurement of the flow velocity can be ensured by means of the apparatus according to the invention.

In the measuring method ultrasound can be generated either continuously or in pulses, depending on the geometry of the pipe. In pulsed running, the phase difference is measured inside the tone burst arriving at the receivers 102, 104. By using pulsed running, the measuring errors caused by reflections of the sound can be eliminated. For example, changes in geometry and/or in temperature might change the phasing of the reflections causing an error in the measurement. The optimal length and repetition frequency of a pulse depends on the geometry of the pipe and on the properties of the sensors. With resonant sensors, the Q-cycle lasts until the amplitude stabilizes. It is advantageous to read the phase from an even area of the pulse. A second boundary condition can be obtained from the shortest distance of the receivers and the transmitters, from the travel time of the pulse coming via reflections, and from the directional gain of the transmitter. For example, if 60 kHz ultrasound and a transmitter possessing a 10 mm diameter are used, then a suitable pulse length for a round pipe is roughly the diameter d of the pipe divided by the speed of sound. Since the measurement is based on measuring phases, the measurement is independent of amplitude.

In both measuring methods, broadband sensors can be advantageously used. With broadband sensors, the phase response is more even, in which case the error caused by the divergence of the Q-values and the resonance frequencies is smaller. Also rise times are shorter, which is important if pulsed running is used. On the transmitter side a low Q-value means a faster pulse response. The transmitter should be sufficiently directional, but, however, in such a way that the beam reaches the receivers at all flow velocities. The width of the transmitter beam can be e.g. 20°-40°, preferably e.g. approx. 30°.

Figure 3:
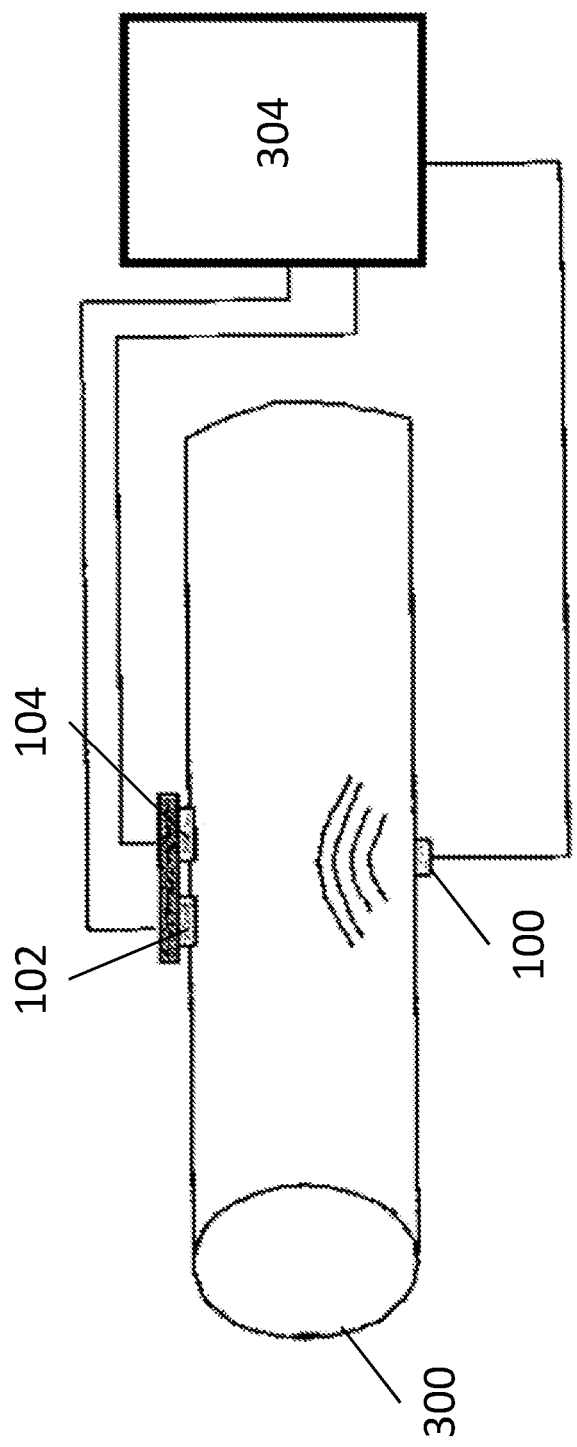
FIG. 3 presents a schematic view of an embodiment, according to the invention, of a flow sensor based on measuring a phase difference.

FIG. 3 presents an apparatus, according to one embodiment of the invention, for measuring air flow. The apparatus comprises one ultrasound transmitter 100 and two receivers 102, 104, which are disposed on opposite sides of a ventilation duct 300. The ultrasound transmitter 100 and the ultrasound receivers 102, 104 are connected to a control unit 304, which comprises measuring electronics, e.g. means for measuring the phase difference of the signals received by the receivers 102, 104. From the phase difference of the signals received by the receivers, the control unit 304 can determine the direction and velocity of the air flow in the ventilation duct. The control unit 304 can also control the ultrasound signal sent by the ultrasound transmitter. The control unit 304 can be integrated into a transmitter and/or receiver or it can be a separate unit. If the control unit 304 is a separate unit, the ultrasound transmitter 100 and ultrasound receivers 102, 104 can be connected to the control unit 304 with a wireline or wirelessly. The control unit 304 can also comprise a display device, with which the measurement results can be presented. The control unit 304 can also transmit the measurement results to an external device, e.g. to a data processing device or to a display device.

Figure 4:
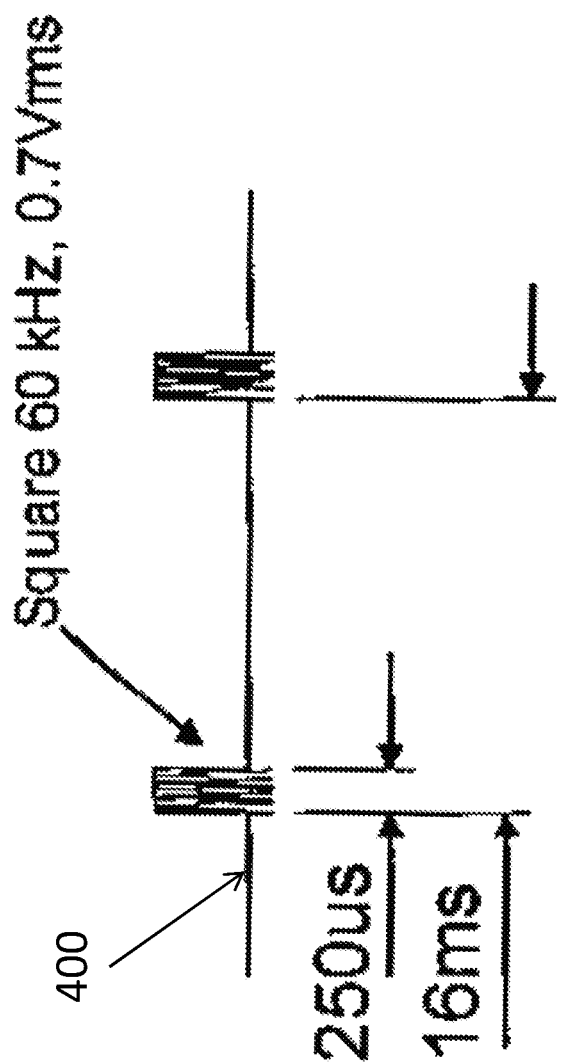
FIG. 4 presents an example of an ultrasound transmitter according to an embodiment of the invention.

In one embodiment of the invention, MEMS microphones, for example, can be used as the ultrasound receivers. The frequency of the ultrasound transmitter can be e.g. 60 kHz, the operating cycle 60 Hz and the length of one pulse 250 microseconds. An example of the signal format 400 sent by the ultrasound transmitter of the embodiment is presented in FIG. 4. Other frequency ratios and pulse ratios also can be used in the solution of the invention and the signal format presented above and in FIG. 4 is only an example.

Interference sources, such as e.g. elbows, T-branches, adaptor fittings, and other such parts, in a ventilation duct cause changes in the air flow, such as e.g. turbulent current, near the parts in question. Ultrasound measurement is a reliable measuring method also at the point of an interference source, but the measurement result of the absolute flow velocity must be compensated so that the measurement result would correspond to the flow velocity elsewhere in the ductwork, i.e. sufficiently far from the interference source. The measurement result is compensated in the solution of the invention with a coefficient, which is determined on the basis of the diameter of the pipe, the interference type and/or the distance between the sensor and the interference source.

In one embodiment of the invention, the diameter of the pipe, the type of interference source and/or the distance between the sensor and the interference source can be determined and/or recorded in the system and/or in the control unit. In one embodiment of the invention, one parameter, e.g. a number, which determines the coefficient to be used in compensation, is determined for the control unit and/or for the system on the basis of the diameter of the pipe, the interference type and/or the distance between the sensor and the interference source.

Figure 5A:
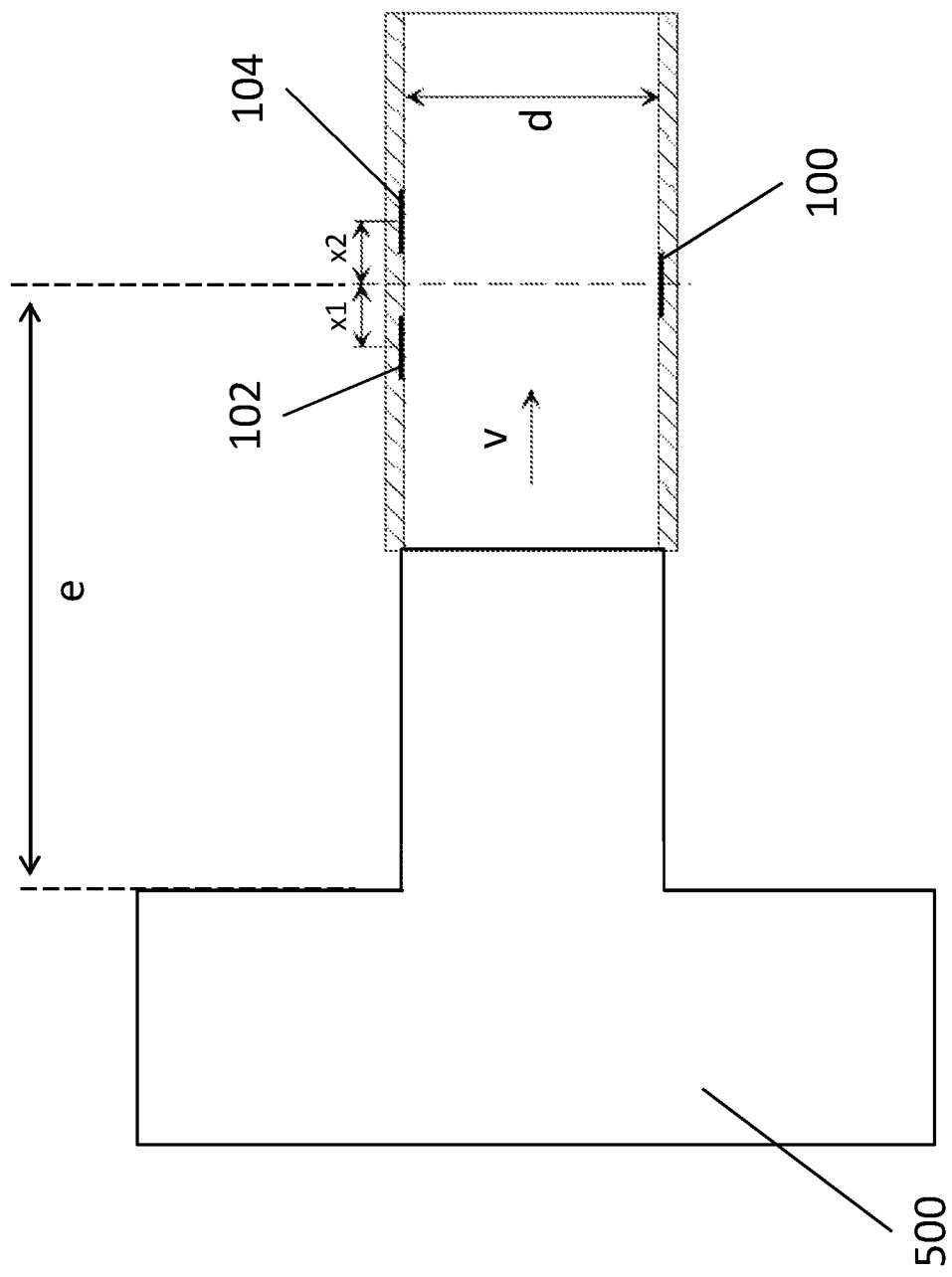
FIGS. 5A-5C present solutions according to an embodiment of the invention in a situation in which an interference source is in the proximity of a sensor.
Figure 5B:
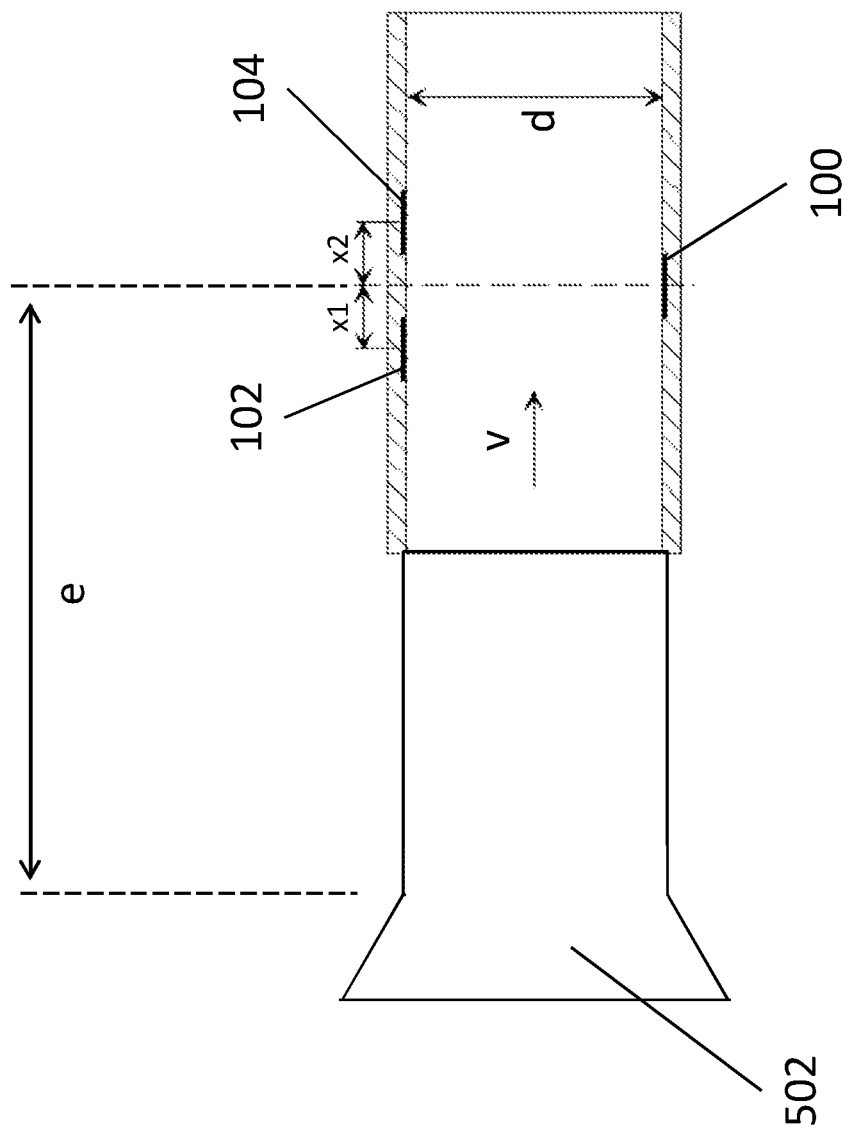
Figure 5C:
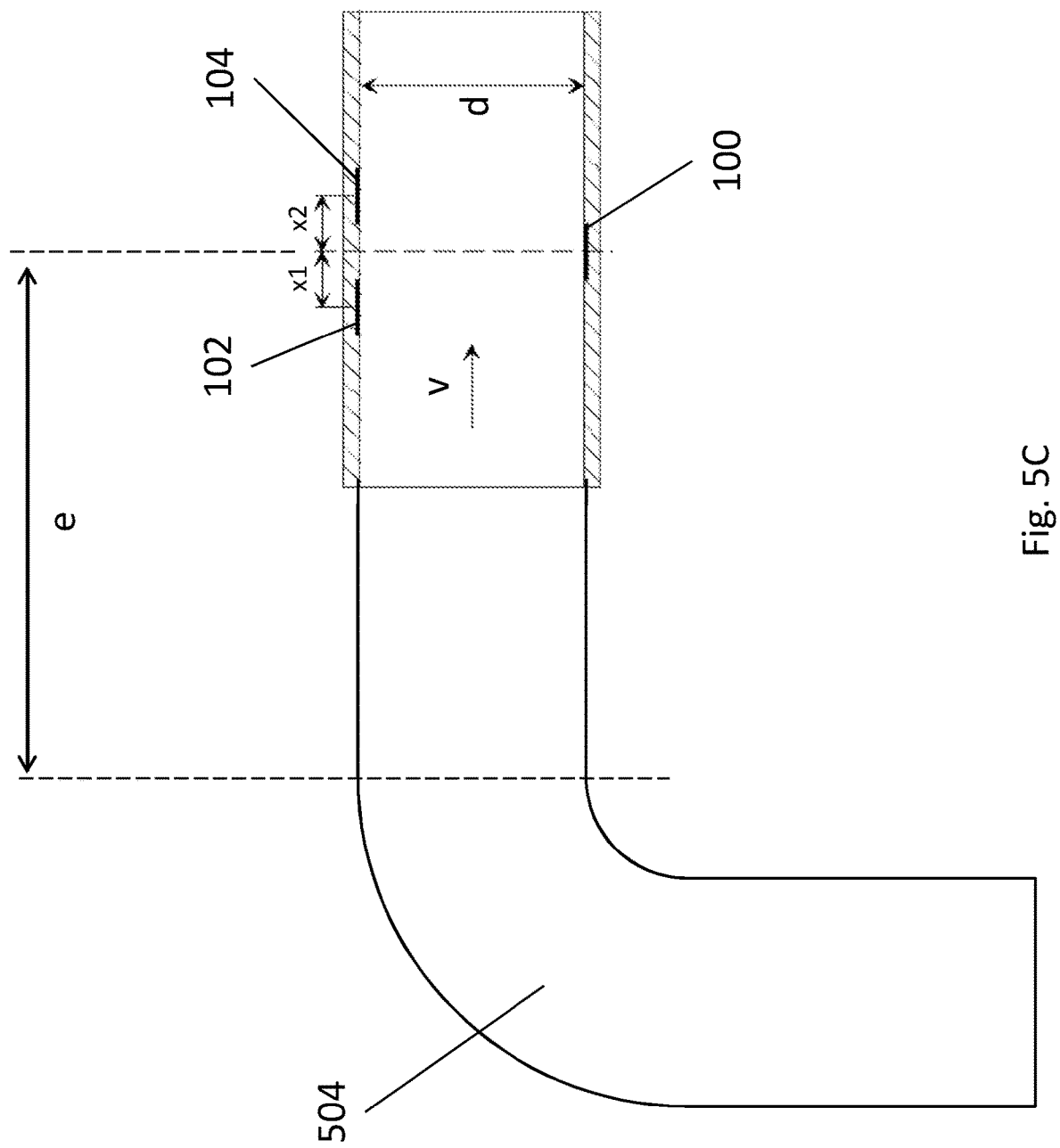

FIGS. 5A-5C present solutions according to an embodiment of the invention in a situation in which an interference source is in the proximity of a sensor. In the embodiment of FIG. 5A, the interference source is a T-branch 500, which is a certain distance e from the center point of the sensor. In the solution according to the invention, the distance e by means of which the coefficient is determined can be defined as e.g. the distance between the point of the interference source nearest the sensor and the center point of the sensor. The distance e can also be defined as essentially the distance between the center point of the sensor and the center point of the interference source and/or the part of the interference source nearest the sensor.

The embodiments of FIGS. 5B and 5C otherwise correspond to the embodiment of FIG. 5A, but in the embodiment of FIG. 5B the interference source is an adaptor fitting 502 and in the embodiment of FIG. 5C the interference source is an elbow 504.

Figure 6:
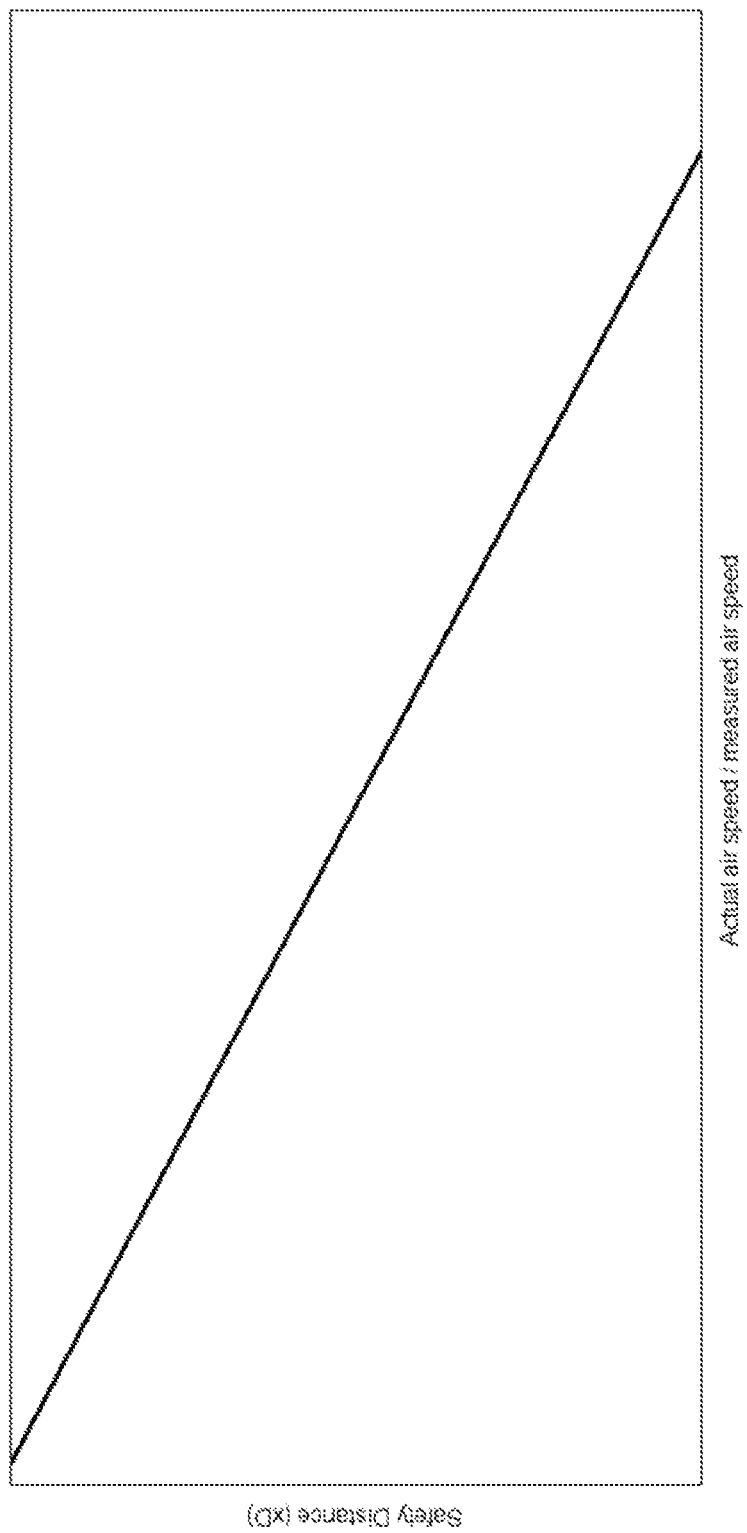
FIG. 6 presents a schematic view of the effect of a certain interference source on a measurement result.

FIG. 6 presents as an example the effect of a certain interference source on an absolute air flow measurement result. In the embodiment of FIG. 6 the measurement results are measured in the proximity of a T-branch. On one axis of FIG. 6 is the ratio of the absolute measured flow velocity and the actual flow velocity in the duct, and on the other axis is the distance from the interference source. When the distance to the interference source is small, the value of the measured flow velocity differs from the actual flow velocity of the air in the ventilation duct, i.e. from the flow velocity far from the interference source. As the distance from the interference source increases, the effect caused by the interference source decreases. When the distance to the interference source is large, the measured flow velocity essentially corresponds to the actual flow velocity of the ventilation duct, i.e. to the velocity sufficiently far from the interference source.

With the coefficient used in the solution of the invention, the measured value of the flow velocity is compensated so that it would essentially correspond to the actual velocity for the ventilation duct, i.e. the velocity far from the interference source.

When the distance from the interference source is small, the measured value of the flow velocity must be compensated more and when the distance from the interference source increases, the need for compensation diminishes.

Also the ventilation duct diameter and the interference source type affect how much compensation the measured value of flow velocity needs at a certain distance from the interference source. In one embodiment of the invention, e.g. certain interference types cause interference in the air flow in such a way that a measurement performed near a T-branch must be compensated, i.e. corrected, most and a measurement near an adaptor fitting leas.

In the solution according to the invention, e.g. in a situation in which an interference source causes a reduction in the flow velocity of the air near an interference source (compared to the actual velocity of air for that ventilation duct, i.e. to the velocity far from the interference source), the measurement result must be compensated by increasing the measured value. In this way, the value is made to essentially correspond to the actual air velocity for that ventilation duct, i.e. the velocity far from the interference source. In such a situation, the closer to an interference source a measurement is performed, the more the measurement result must be compensated, i.e. in this example situation increased. The farther away from an interference source a measurement is performed, the less the measurement result requires compensation, i.e. in this example situation, increasing.

The coefficient to be used in the solution of the invention can be formed e.g. experimentally, i.e. by measuring or simulating the air flow near a certain type of interference source at certain distances from it. The measuring and/or simulating can be performed separately for different diameters of the pipe. In one embodiment of the invention, the coefficient or coefficients can be recorded in a database, a table and/or in the control unit.

In one embodiment of the invention, the ultrasound receivers do not need to be on the opposite side of the ventilation duct with respect to the ultrasound transmitter, but instead it is also possible that the ultrasound transmitter and one or more ultrasound receivers are on the same side of the ventilation duct. If the ultrasound transmitter and an ultrasound receiver or ultrasound receivers are on the same side of the ventilation duct, a ventilation duct surface is needed on the other side of the sensors, the surface reflecting the ultrasounds sent by the ultrasound transmitter to the ultrasound receiver or ultrasound receivers. It is advantageous to shape or to treat the surface of the pipe in such a way that sound reflects efficiently back to the receivers.

In one embodiment of the invention, an individual ultrasound sensor can be used both as an ultrasound receiver and as an ultrasound transmitter.

The device according to the invention for measuring air flow can be rigidly installed into connection with a ventilation duct. In one embodiment of the invention, the ultrasound transmitter sensor and the ultrasound receiver sensors are rigidly installed into connection with a ventilation duct, e.g. on the inside surface of the ventilation ductwork. In another embodiment of the invention, the ultrasound transmitter sensor and the ultrasound receiver sensors are rigidly integrated as a part of the pipe in such a way that at least a part of the structure of the sensors is outside the pipe and an aperture corresponding to the transmitter and/or receiver of the sensor is made in the pipe, by means of which aperture the sensor can send or receive ultrasound signals that are inside the ventilation duct. The control unit of the apparatus according to the invention can also be integrated into connection with a sensor or sensors, or the apparatus can comprise only connectors with which a separate control unit can be connected to the sensors. An advantage of sensors rigidly installed into parts of ventilation ductwork, e.g. in pipes, is that the parts of the ventilation ductwork are easily installable into their position, and when installing them there is no need to perform separate adjustment or installation procedures on the air flow sensors.

With the apparatus according to the invention continuous measurement of the air flow can be performed or the measuring of air flow can be regulated to occur at certain predefined and/or selectable intervals of time.

The apparatus according to the invention for measuring air flow can be used for measuring the air flow in different parts of a ventilation system, such as e.g. in ducts, regulating boxes, fans, flow controllers, Iris dampers and measurement heads.

It is obvious to the person skilled in the art that the different embodiments of the invention are not limited solely to the examples described above, and that they may therefore be varied within the scope of the claims presented below. The characteristic features possibly presented in the description in conjunction with other characteristic features can also, if necessary, be used separately to each other.

The invention claimed is:

1. A measuring apparatus of a ventilation duct for measuring air flow, the apparatus comprising:
    a sensor fittable into connection with the duct at a certain distance from an interference source, the sensor comprising an ultrasound transmitter and at least two ultrasound receivers; and
    a control unit to which the ultrasound transmitter and ultrasound receivers are connectable,
    wherein the control unit is adapted to measure the phase difference of an ultrasound signal received at the same moment in time by at least two ultrasound receivers fitted into connection with the duct and based, on the measured phase difference, to determine the flow velocity and/or flow direction of the air,
    wherein the control unit and/or system is adapted to store one parameter, which determines the coefficient to be used in compensation, on the basis of the diameter of the pipe, the interference type and the distance between the sensor and the interference source, and
    wherein the control unit is adapted to compensate the determined flow velocity and/or flow direction of the air with the said one parameter.

2. The apparatus according to claim 1, wherein the type of interference source is an elbow, a sound diffuser, a T-branch and/or an adaptor fitting.

3. The apparatus according to claim 1, wherein the ultrasound receivers are situated in such a way that that the distance from both ultrasound receivers to the ultrasound transmitter is of the same magnitude.

4. The apparatus according to claim 1, wherein the ultrasound receivers are on opposite sides of the ventilation duct with respect to the ultrasound transmitter.

5. The apparatus according to claim 1, wherein the apparatus is adapted to perform measuring as continuous measuring.

6. The apparatus according to claim 1, wherein the apparatus is adapted to perform measuring at predefined and/or at selectable intervals of time.

7. A method for measuring air flow in a ventilation duct with a measuring apparatus of a ventilation duct, wherein the apparatus comprises a sensor fittable into connection with the duct at a certain distance from an interference source, the sensor comprising an ultrasound transmitter and at least two ultrasound receivers, and a control unit to which the ultrasound transmitter and ultrasound receivers are connectable, the method comprising:
the control unit measuring the phase difference of an ultrasound signal received at the same moment in time by at least two ultrasound receivers fitted into connection with the duct and, based on the measured phase difference, determining the flow velocity and/or flow direction of the air;
the control unit and/or system storing one parameter, which determines the coefficient to be used in compensation, on the basis of the diameter of the pipe, the interference type and the distance between the sensor and the interference source; and
the control unit compensating the determined flow velocity and/or flow direction of the air with the said one parameter.

8. The method according to claim 7, wherein the type of interference source is an elbow, a sound diffuser, a T-branch and/or an adaptor fitting.

9. The method according to claim 7, wherein the ultrasound transmitter sends an ultrasound signal as a pulsed signal.

10. The method according to claim 9, wherein the control unit measures the phase difference inside one ultrasound signal pulse of an ultrasound signal received at the same moment in time by at least two ultrasound receivers fitted into connection with the duct.

11. The method according to claim 7, wherein the ultrasound transmitter sends an ultrasound signal as a continuous signal.

12. The method according to claim 7, wherein the measuring is performed as continuous measuring.

13. The method according to claim 7, wherein the measurement of the apparatus is performed at predefined and/or at selectable intervals of time.

14. The apparatus according to claim 2, wherein the ultrasound receivers are situated in such a way that that the distance from both ultrasound receivers to the ultrasound transmitter is of the same magnitude.

15. The apparatus according to claim 2, wherein the ultrasound receivers are on opposite sides of the ventilation duct with respect to the ultrasound transmitter.

16. The apparatus according to claim 3, wherein the ultrasound receivers are on opposite sides of the ventilation duct with respect to the ultrasound transmitter.

17. The apparatus according to claim 2, wherein the apparatus is adapted to perform measuring as continuous measuring.

18. The apparatus according to claim 3, wherein the apparatus is adapted to perform measuring as continuous measuring.

19. The apparatus according to claim 4, wherein the apparatus is adapted to perform measuring as continuous measuring.

20. The apparatus according to claim 2, wherein the apparatus is adapted to perform measuring at predefined and/or at selectable intervals of time.

* * * * *